(12) United States Patent
Witzel et al.

(10) Patent No.: US 7,008,072 B2
(45) Date of Patent: Mar. 7, 2006

(54) LIGHT FOR BARBECUE GRILL

(75) Inventors: Theodore A. Witzel, Kitchener (CA);
Frankie Cheung, Waterloo (CA)

(73) Assignee: Onward Multi-Corp Inc., Waterloo (CA)

( * ) Notice: Subject to any disclaimer, the term of this patent is extended or adjusted under 35 U.S.C. 154(b) by 62 days.

(21) Appl. No.: 10/438,216

(22) Filed: May 15, 2003

(65) Prior Publication Data

US 2004/0228117 A1  Nov. 18, 2004

(51) Int. Cl.
*F27D 21/02* (2006.01)
(52) U.S. Cl. .................... 362/92; 362/191; 362/253; 126/25 R; 126/213
(58) Field of Classification Search ............... D26/60; 362/92, 127, 191, 208, 234, 253, 400; 126/25 R, 126/213
See application file for complete search history.

(56) References Cited

U.S. PATENT DOCUMENTS

| | | | | |
|---|---|---|---|---|
| 2,254,134 | A | * | 8/1941 | Berry .......................... 126/213 |
| 5,257,169 | A | * | 10/1993 | Walendziak .................. 362/92 |
| 5,664,875 | A | * | 9/1997 | Hegedus ..................... 362/191 |
| 6,132,055 | A | * | 10/2000 | Grisamore et al. ........... 362/92 |
| D464,754 | S | | 10/2002 | Cavins |
| 2004/0001334 | A1 | * | 1/2004 | Choi et al. .................. 362/127 |

* cited by examiner

*Primary Examiner*—Stephen Husar
(74) *Attorney, Agent, or Firm*—Daryl W. Schnurr

(57) ABSTRACT

A light assembly for a barbecue grill has a body with an extension at one end and a light at the other end. The barbecue grill has a hollow handle extending from one side of a lid. The handle is hollow and the extension is sized to fit with the handle. The light assembly and barbecue grill are used in combination.

22 Claims, 3 Drawing Sheets

LIGHT FOR BARBECUE GRILL

BACKGROUND OF THE INVENTION

1. Field of Invention

This invention relates to a light assembly for a barbecue grill and to a light assembly and barbecue grill in combination and, more particularly, to a light assembly and to a light assembly and barbecue grill in combination wherein there is a handle on the barbecue grill lid that is sized and shaped to support the light.

2. Description of the Prior Art

Lights for barbecue grills are known. A barbecue grill light is described in Cavins U.S. D464,754. The light described in the Cavins' design patent clips onto a lid of a barbecue grill. It is also known to have a light in an elongated replacement handle that extends across the front of the barbecue grill and extends beyond the lid toward the base when the lid is in a closed position. The replacement handle contains two lights. Each end of the replacement handle unscrews to provide access to a battery chamber, there being one battery chamber at each end to operate each light. There is a switch on the replacement handle to turn the lights on and off and the handle is fixed within the supports so that it cannot move relative to the supports.

The Cavins' light is clipped onto a front of the barbecue grill and extends outward therefrom. Since the light extends out the front of the barbecue grill, it could easily be bumped by a user. If a user of the barbecue grill bumps into the light, it can easily become detached from the barbecue grill and can be damaged. The light could fall off the barbecue grill, even with the minimal vibration and movement caused by moving the barbecue grill from storage to a new location for barbecuing. Also, it is difficult to adjust the Cavins' light to such an extent that it will shine on the food when the lid is opened. The angle of the Cavins' light relative to the grill will change with the shape of the barbecue lid with which the light is used. Also, the Cavins' light must be insulated in some way or it will overheat from the heat generated by the barbecue grill. The elongated replacement light is relatively expensive and the lights are not adjustable without the use of a screwdriver or other tool once the lights are installed. The elongated replacement light is complex and expensive. It is also not easily removed from the barbecue grill without the use of tools. The previous lights suffer from disadvantages in that they are not readily adjustable, they are expensive to manufacture, they can easily fall off the barbecue grill when the barbecue grill is subjected to vibration or sudden movement, they are not adjustable over a wide enough range or they detract from the appearance of the barbecue grill, or the light is not readily removable from the barbecue grill.

Barbecue grill lights are important for night barbecuing in order to determine the degree to which the food has been cooked. The light must be bright enough to observe the colour of the food. Some users use a hand-held flashlight for this purpose. A light mounted on the barbecue grill allows the users to have both hands free to engage in the barbecuing process.

SUMMARY OF THE INVENTION

A light assembly for use with a barbecue grill having a base and lid with at least one handle connected to the lid, has a body with a first end and a second end. The first end has an extension thereon and the second end has a light thereon. The handle is sized and shaped to receive the extension so that the light assembly can be securely supported on the barbecue grill, but readily removable therefrom.

A light assembly and barbecue grill in combination, the combination comprising a barbecue grill having a base and a lid with at least one handle connected to the lid, the light assembly having a body with a first end and a second end. The first end has an extension thereon and the second end has a light thereon. The handle is sized and shaped to receive the extension so that the light assembly can be securely mounted on the barbecue grill and is readily removable therefrom.

DETAILED DESCRIPTION OF A PREFERRED EMBODIMENT

Figure 1:
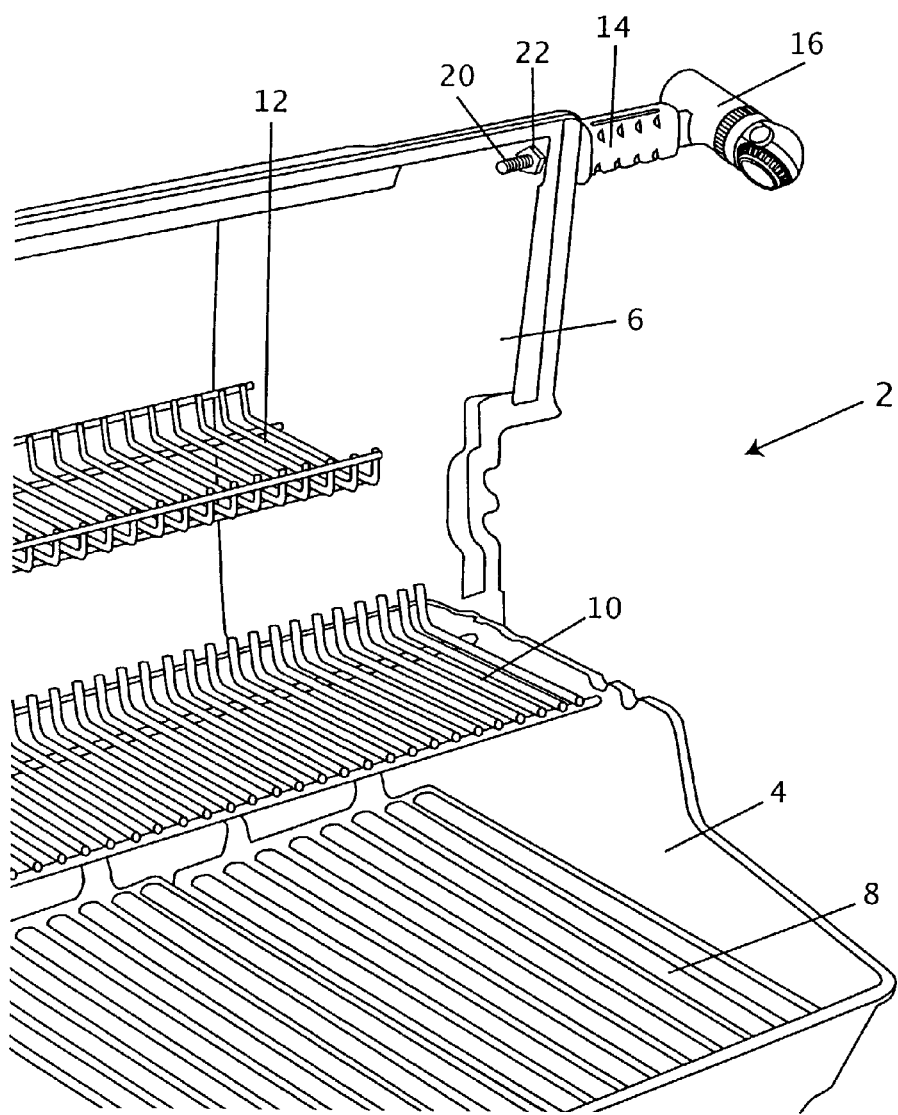
FIG. 1 is a perspective view of part of a barbecue grill having a light assembly mounted thereon.

In FIG. 1, a barbecue grill 2 has a base 4 and a lid 6 that is hinged to the base in a conventional manner. The barbecue grill 2 has a main cooking grid 8 and upper cooking grids 10, 12. A handle 14 is bolted to one side of the lid 6 by bolt 18 and nut 22. An opposite side of the lid 6 (not shown) could have a second handle 14 affixed thereto. The barbecue grill is conventional and is not further described in detail. Usually, the barbecue grill will be a gas barbecue grill and have a gas burner (not shown), but the barbecue grill could have any other type of burner as well. A light assembly 16 is slidably mounted within the handle 14.

Figure 2:
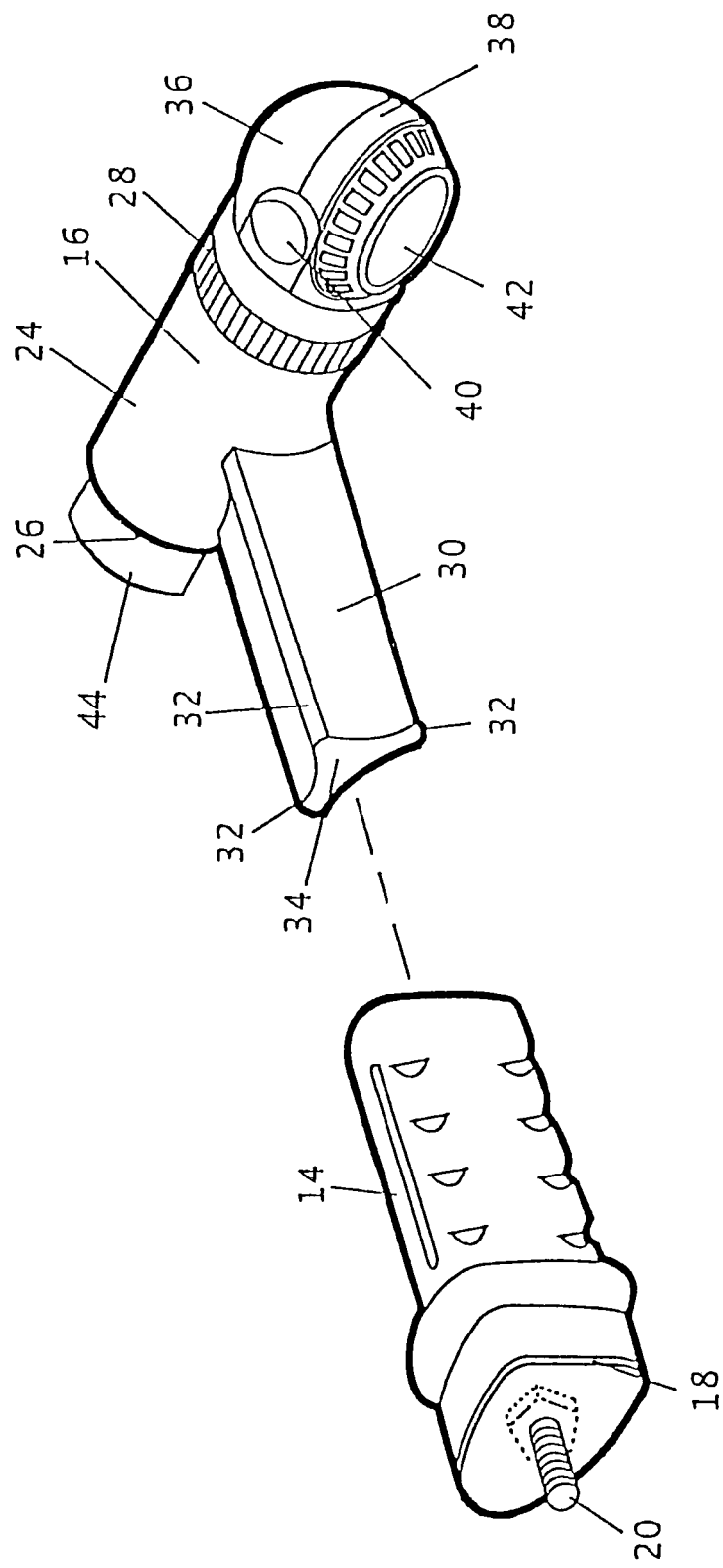
FIG. 2 is an exploded perspective view of a light assembly and handle when viewed from the handle.
Figure 3:
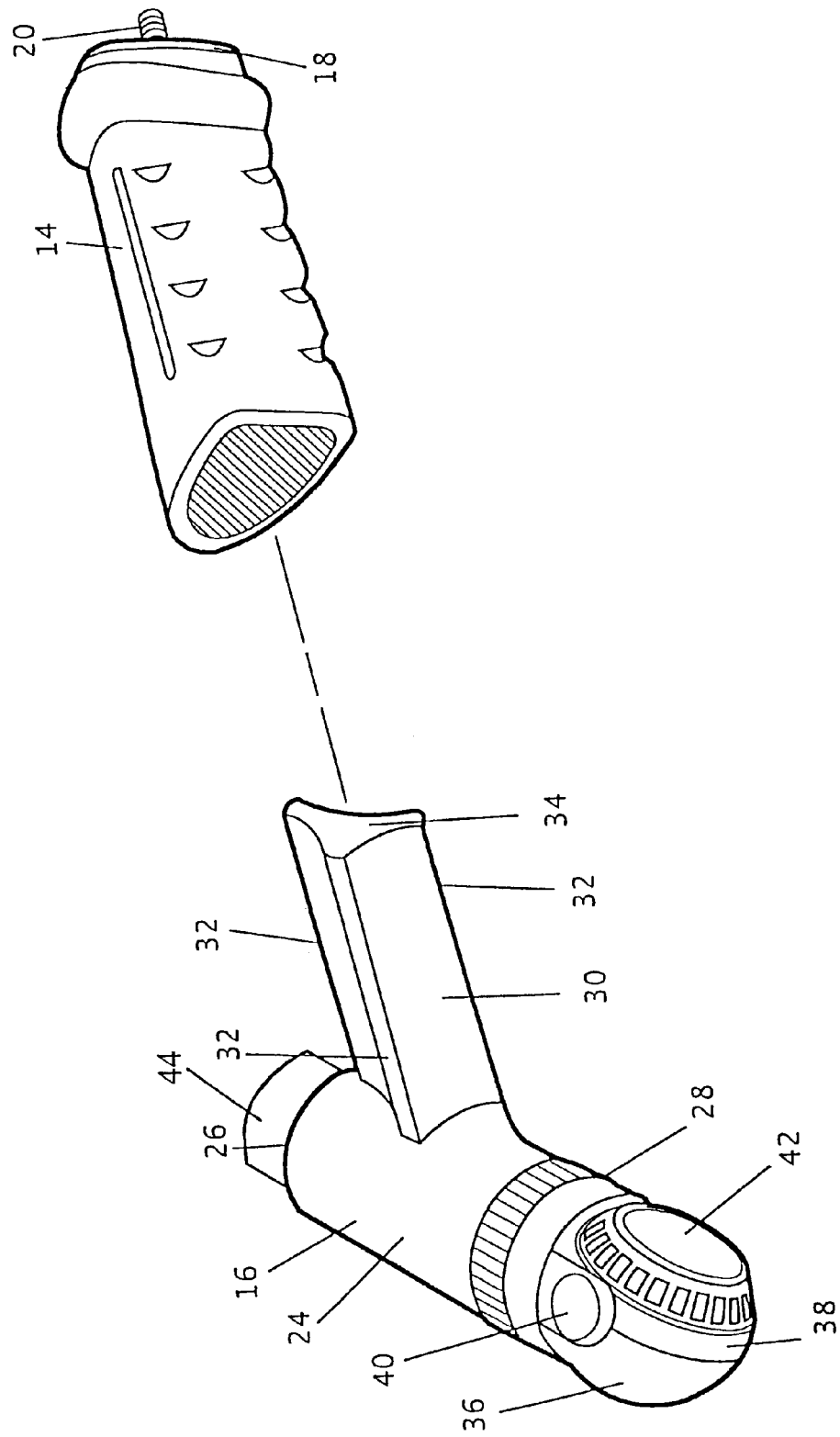
FIG. 3 is an exploded perspective view of a light assembly and handle when viewed from the light assembly.

In FIGS. 2 and 3, it can be seen that the handle 14 is hollow and has a layer of insulation 18 and a bolt 20 extending from one end thereof. The bolt 20 has a screw thread thereon and a nut 22 holds the layer of insulation 18 in place between the handle 14 and the lid 6 of the barbecue grill 2. The handle is installed in a conventional manner on the lid 6 of the barbecue grill 2 by removing the nut 22 from the bolt 20 and inserting the bolt 20 through a suitable opening (not shown) in the side of the lid 6. The layer of insulation 18 is located between the handle 14 and the lid 6 and protects the handle 14 from the heat generated by the barbecue grill. Preferably, the handle is made of plastic material. The handle 14 has a generally triangular cross-sectional shape with rounded corners. The light assembly 16 has a body 24 with a first end 26 and a second end 28. Extending outward from the first end 26 (laterally to a longitudinal axis of the body 24) is an extension 30. The extension 30 has a generally triangular shape with rounded corners 32. The handle 14 and the extension 30 are sized and shaped relative to one another so that the extension 30 slides within the hollow handle 14. The extension 30 tapers outward slightly from a free end 34 to the body 24 so that a tight fit is achieved between the handle 14 and the light assembly 16 when the extension is fully inserted within the handle. The greater the distance of insertion, the tighter fit between extension and the handle. The handle extension could easily be designed in the opposite manner so that the extension would slide outside of the handle. The generally triangular shape of the handle and extension prevent the rotation of the extension within the handle. Extending from the second end 28, is a light 36. The body 24 is hollow and contains a battery or batteries (not shown) for the light 36.

Preferably, the batteries are mounted in a cartridge (not shown) that is connected to a base 37 of the light 36. The connectors between the battery or batteries and the light are not shown. The light 36 is connected to the second end 28 of the body 24 in such a manner that the light 36 has two degrees of freedom relative to the body 24. A barbecue grill with two handles 14, can have two light assemblies, one light assembly mounted in each handle. When the light assemblies are removed, the handles will appear normal and the barbecue grill will not appear to be incomplete.

The light 36 has a light bulb (not shown) and is conventional. The light has two degrees of freedom relative to the body 24. The light 36 rotates relative to the body 24 about a longitudinal axis of the body 24. That rotation constitutes one degree of freedom. In addition, a head 38 of the light 36 rotates about a pivot point 40 on either side of the head 38. Only one of the pivot points 40 is shown. That rotation constitutes another degree of freedom. The two axes of rotation allow a face 42 of the light to be infinitely adjustable so that the light 36 can readily be adjusted to shine on the food on the cooking grid when the lid is opened or can be redirected in other directions as well. The rotation of the head 36 on both axes is controlled by friction fit so that the light face 42 will remain in a position to which it has been adjusted until it is readjusted. Since the light assembly 16 easily slides out of the handle 14, the assembly can be taken indoors so that it is not subject to the weather conditions when the barbecue grill is not in use. This is particularly important during the winter as the batteries will not function when the temperature drops below a certain level. Also, the light is most often required during the winter when the days are shorter. Since the light is easily removable from the handle it can be removed at the end of each barbecuing session and installed at the beginning of each barbecuing session. The light can also be removed and held to light a path to and from the barbecue grill. When installed on the barbecue grill the light of the present invention does not appear to be an add-on accessory but appears to be an integral part of the barbecue grill.

While no on-off switch is shown in the drawings, the light assembly preferably has an on-off switch that is activated to the off position by rotating the face 42 toward the base 37. When the face is generally parallel to the base 37, the light is off. When the face is rotated away from the base 37, the light is turned on. Other on-off switches could be used as well.

Preferably, the light assembly is used in combination with an adjustable timer (not shown) that is removably mounted on the end 26 of the body 24. The end 26 can be modified to receive the timer and the timer can be shaped to be removably attached to the end 26. The timer is adjustable to set and to vary the time that is set. The timer is preferably cylindrical in shape to correspond generally to the diameter of the body 24. The timer has a much shorter length from the body 24 and has an alarm to monitor the cooking time for steaks and other items that are cooked on the barbecue grill. The timer preferably has a magnet affixed thereto to enable the timer to be stored on a metal surface, such as a fridge.

We claim:

1. A light assembly for use with a barbecue grill, said barbecue grill having a base and a lid with at least one handle connected to said lid, said light assembly having a body with a first end and a second end, said first end having an extension connected thereto, said second end having a light thereon, said handle being sized and shaped to receive said extension of said light assembly so that said light assembly is securely affixed to said handle and readily removable therefrom.

2. A light assembly as claimed in claim 1 wherein to extension tapers outward from a free end to said body.

3. A light assembly as claimed in claim 2 wherein said light is connected to said body with two degrees of freedom.

4. A light assembly as claimed in claim 3 wherein said body houses batteries for said light.

5. A light assembly as claimed in claim 3 wherein a first degree of freedom of said two degrees of freedom is about a longitudinal centre axis of said body and a second degree of freedom of said two degrees of freedom is perpendicular to said first degree of freedom.

6. A light assembly as claimed in any one of claim 1, 2 or 3 wherein the handle has a triangular shape with rounded corners and the extension has a triangular shape with rounded corners.

7. A light assembly as claimed in any one of claim 1, 2 or 3 wherein the handle is hollow and has a generally triangular cross sectional shape with rounded corners and the extension has a generally triangular shape with rounded corners.

8. A light assembly as claimed in claim 2 wherein said handle is hollow and said extension kits within said handle, there being an abutment on said extension to limit a distance that said extension can slide within said handle.

9. A light assembly as claimed in claim 2 wherein said barbecue grill has handles and there are two light assemblies, one light assembly being received by each handle.

10. A light assembly as claimed in any one of claim 1, 2 or 3 wherein the said assembly has an adjustable timer thereon.

11. A light assembly and barbecue grill in combination, said combination comprising a barbecue grill having a base and a lid with at least one handle connected to said lid, said light assembly having a body with a first end and a second end, said first end having extension connected thereto, said second end having a light thereon, said handle being sized and shaped to receive said extension of said light assembly so that said light assembly can be securely affixed to said handle and be readily removable therefrom.

12. A light assembly and barbecue grill in combination as claimed in claim 11 wherein the extension tapers outward from a free end to said body.

13. A light assembly and barbecue grill in combination as claimed in claim 12 wherein said light is connected to said body with two degrees of freedom.

14. A light assembly and barbecue grill in combination as claimed in claim 13 wherein said body houses batteries for said light.

15. A light assembly and barbecue grill in combination as claimed in claim 14 wherein a first degree of freedom of said two degrees of freedom is about a longitudinal centre axis of said body and a second degree of freedom of said two degrees of freedom is perpendicular to said first degree of freedom.

16. A light assembly and barbecue grill in combination as claimed in any one of claim 11, 12 or 13 wherein the handle is hollow and said extension fits within said handle.

17. A light assembly and barbecue grill in combination as claimed in any one of claim 11, 12, or 13 wherein the handle has a triangular shape with rounded corners and the extension has a triangular shape with rounded corners.

18. A light assembly and barbecue grill in combination as claimed in any one of claim 11, 12 or 13 wherein the handle is hollow and has a generally triangular cross sectional shape with rounded corners and the extension has a generally triangular shape with rounded corners.

19. A light assembly and barbecue grill in combination as claimed in claim 13 wherein said handle is hollow and said extension fits within said handle, there being an abutment on said extension to limit a distance that said extension can slide within said handle.

20. A light assembly and barbecue grill in combination as claimed in claim 12 wherein said barbecue grill has two handles and there are two light assemblies, one light assembly being received by each handle.

21. A light assembly and barbecue grill in combination as claimed in any one of claim 11, 12 or 13 wherein said barbecue grill has a cooking grid and said light illuminates said cooking grid when said lid is open.

22. A light assembly and barbecue grill in combination as claimed in any one of claim 11, 12, or 13 wherein said assembly has an adjustable timer thereon.

* * * * *